US011353071B2

(12) United States Patent
Shao et al.

(10) Patent No.: US 11,353,071 B2
(45) Date of Patent: Jun. 7, 2022

(54) MOTOR BRAKE MODULE HAVING REDUCED VIBRATION IN BRAKING MOTION

(71) Applicant: DELTA ELECTRONICS, INC., Taoyuan (TW)

(72) Inventors: Chi-Huan Shao, Taoyuan (TW); Chi-Shun Chang, Taoyuan (TW); Chih-Ming Hsu, Taoyuan (TW)

(73) Assignee: DELTA ELECTRONICS, INC, Taoyuan (TW)

( * ) Notice: Subject to any disclaimer, the term of this patent is extended or adjusted under 35 U.S.C. 154(b) by 940 days.

(21) Appl. No.: 16/017,784

(22) Filed: Jun. 25, 2018

(65) Prior Publication Data

US 2019/0301548 A1  Oct. 3, 2019

(30) Foreign Application Priority Data

Mar. 29, 2018  (CN) .......................... 201810273324.0

(51) Int. Cl.
*H02K 7/102* (2006.01)
*F16D 63/00* (2006.01)

(52) U.S. Cl.
CPC ......... *F16D 63/006* (2013.01); *H02K 7/1021* (2013.01)

(58) Field of Classification Search
CPC .. F16D 63/006; H02K 7/1021; H02K 7/1023; H02K 49/10; H02P 3/04
USPC .................................................. 310/76, 103
See application file for complete search history.

(56) References Cited

U.S. PATENT DOCUMENTS

| 2011/0056795 A1 | 3/2011 | Joshi et al. |
| 2011/0094835 A1 | 4/2011 | Winkler |
| 2018/0200896 A1* | 7/2018 | Boyland ................. F16D 66/00 |

FOREIGN PATENT DOCUMENTS

| CN | 106763340 A | 5/2017 |
| CN | 107401565 A | 11/2017 |
| CN | 107585700 A | 1/2018 |
| DE | 19604712 A1 | 8/1997 |
| TW | 306588 U | 5/1997 |
| TW | M284783 U | 1/2006 |
| TW | M355944 U | 5/2009 |
| TW | M542712 U | 6/2017 |

* cited by examiner

*Primary Examiner* — Shawki S Ismail
*Assistant Examiner* — Monica Mata
(74) *Attorney, Agent, or Firm* — Kirton McConkie; Evan R. Witt

(57) ABSTRACT

A motor brake module for braking a motor is provided. The motor includes a shell, a shaft portion and a driving portion. The motor brake module includes a brake assembly, a block assembly and an armature assembly. The brake assembly includes a shaft hole, plural teeth and plural openings. The shaft portion passes through the shaft hole, and the shaft portion drives the brake assembly to rotate when the shaft portion is rotated. The armature assembly is connected with the block assembly for driving the block assembly to move between the armature assembly and the brake assembly. When the block assembly is moved toward the brake assembly, a portion of the block assembly is contacted with one of the plural teeth and the other portion of the block assembly passes through one of the plural openings.

10 Claims, 13 Drawing Sheets

MOTOR BRAKE MODULE HAVING REDUCED VIBRATION IN BRAKING MOTION

CROSS-REFERENCE TO RELATED APPLICATION

This application claims priority to China Patent Application No. 201810273324.0 filed on Mar. 29, 2018, the entire contents of which are incorporated herein by reference for all purposes.

FIELD OF THE INVENTION

The present invention relates to a motor brake module, and more particularly to a motor brake module having less vibration in braking motion.

BACKGROUND OF THE INVENTION

Generally, a motor brake module is installed on a motor for decelerating, stopping or accurately positioning the motor. FIG. 1A is a schematic view showing a conventional motor brake module in an unbraking state. FIG. 1B is a schematic cross-sectional view showing the conventional motor brake module of FIG. 1A. FIG. 2A is a schematic view showing the conventional motor brake module of FIG. 1A in a braking state. FIG. 2B is a schematic cross-sectional view showing the conventional motor brake module of FIG. 2A. The motor brake module 1 is applicable to the motor 11 for braking the motor 11. The motor brake module 1 includes a ratchet 12, a block component 13 and an armature base 14. The ratchet 12 is detachably mounted on a shaft 111 of the motor 11, and disposed between the block component 13 and the armature base 14. The ratchet 12 is driven by the shaft 111 of the motor 11 to rotate. The ratchet 12 includes plural teeth 121. The plural teeth 121 and the ratchet 12 are rotated around the shaft 111 of the motor 11 synchronously. Moreover, the armature base 14 drives the block component 13 to move in the directions close to and away from the armature base 14.

As shown in FIGS. 1A and 1B, when the motor 11 is not braked, the shaft 111 of the motor 11 drives the ratchet 12 to rotate and the armature base 14 drives the block component 13 to move in the direction away from the armature base 14 simultaneously. Consequently, the block component 13 is not contacted with the tooth 121 of the ratchet 12. As shown in FIGS. 2A and 2B, when the motor 11 is braked by the motor brake module 1, the armature base 14 drives the block component 13 to move toward the armature base 14 till the block component 13 and the ratchet 12 are aligned with each other. Under this circumstance, the block component 13 is contacted with one of the plural teeth 121 to block the rotation of the ratchet 12. Consequently, the shaft 111 of the motor 11 stops rotating to brake the motor 11. However, because the plural teeth 121 comprise a big angle gap between each other, the motor brake module 1 generates a bigger backlash when the block component 13 is contacted with one of the plural teeth 121. Consequently, the motor brake module 1 is vibrated easily in the braking motion.

Therefore, there is a need of providing a motor brake module to obviate the drawbacks encountered from the prior arts.

SUMMARY OF THE INVENTION

The present disclosure provides a motor brake module in order to obtain smaller backlash and has less vibration in the braking motion.

In accordance with an aspect of the present disclosure, there is provided a motor brake module for braking a motor. The motor includes a shell, a shaft portion and a driving portion. The shaft portion is disposed on the driving portion. The shaft portion is driven by the driving portion and the shaft portion is rotated accordingly. The motor brake module includes a brake assembly, a block assembly and an armature assembly. The brake assembly is disposed between the shell and the driving portion and includes a shaft hole, plural teeth and plural openings. The shaft portion passes through the shaft hole. The shaft portion drives the brake assembly to rotate when the shaft portion is rotated. The armature assembly is disposed on the shell. The armature assembly is connected with the block assembly for driving the block assembly to move between the armature assembly and the brake assembly. When the block assembly is moved toward the brake assembly, a portion of the block assembly is contacted with one of the plural teeth and the other portion of the block assembly passes through one of the plural openings, so that the motor is braked.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
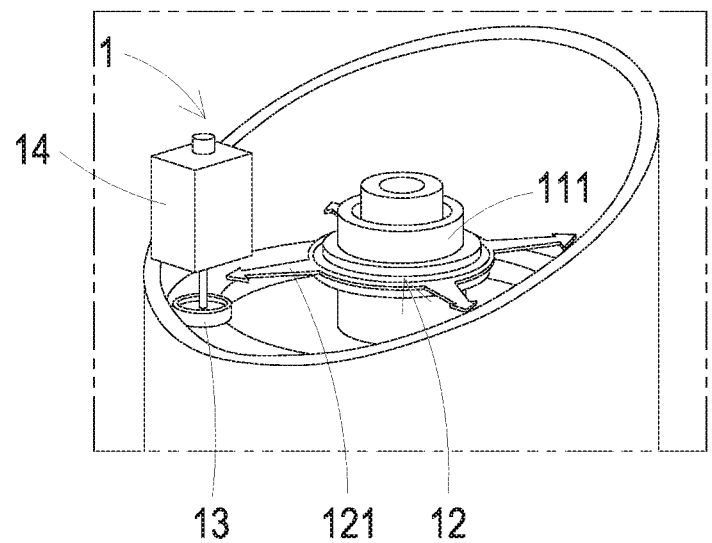
FIG. 1A is a schematic view showing a conventional motor brake module in an unbraking state.
Figure 1B:
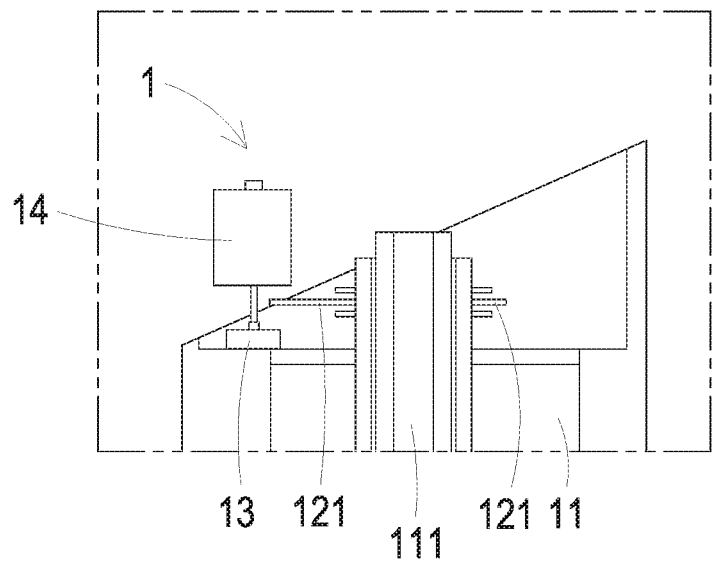
FIG. 1B is a schematic cross-sectional view showing the conventional motor brake module of FIG. 1A.
Figure 2A:
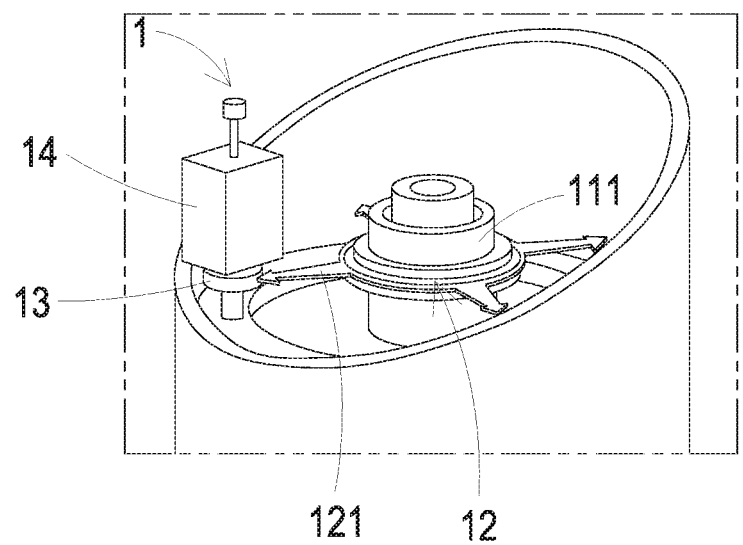
FIG. 2A is a schematic view showing the conventional motor brake module of FIG. 1A in a braking state.
Figure 2B:
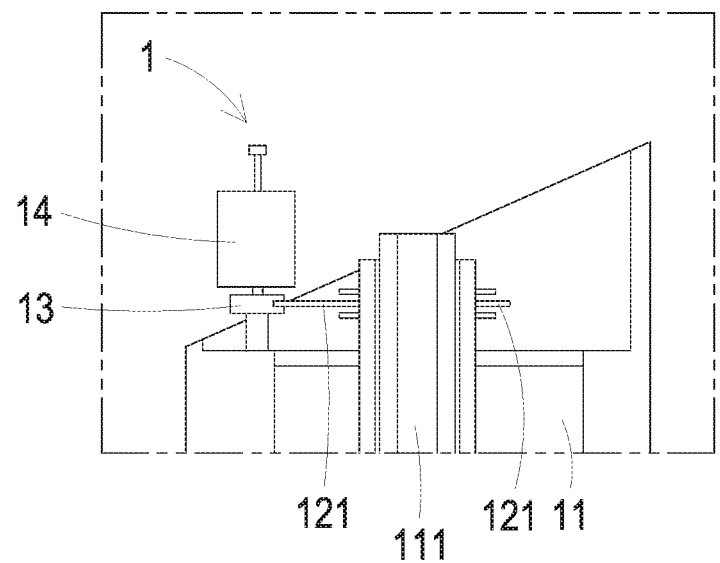
FIG. 2B is a schematic cross-sectional view showing the conventional motor brake module of FIG. 2A.
Figure 3:
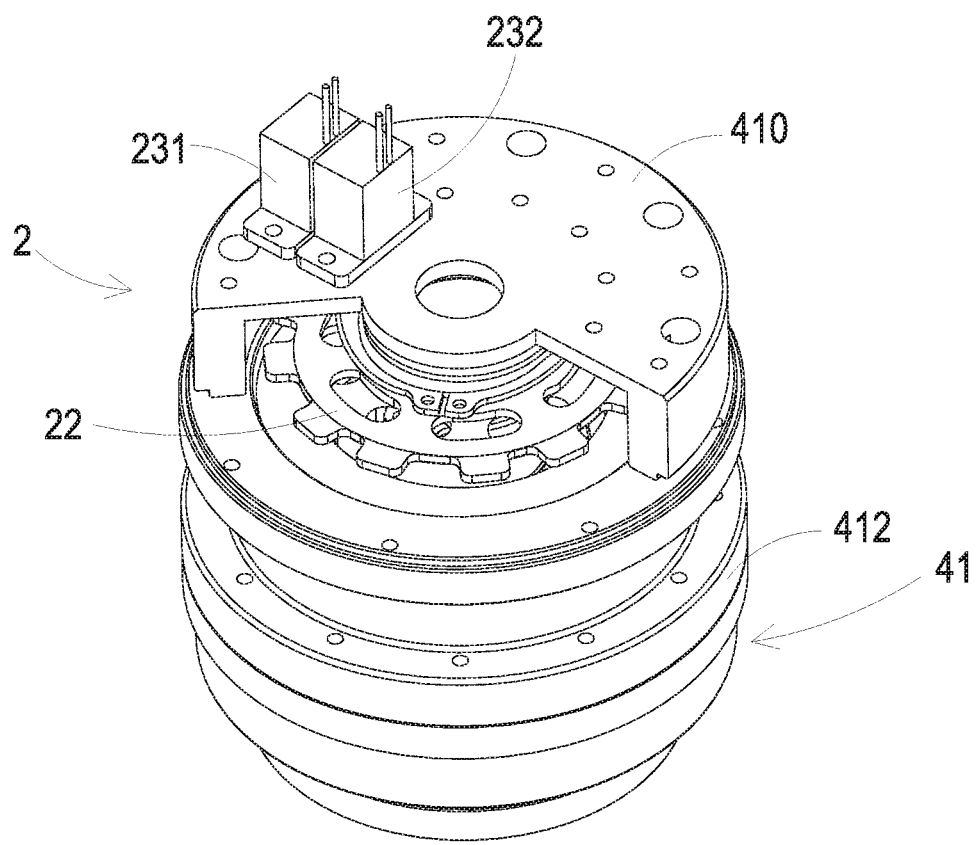
FIG. 3 is a schematic perspective view illustrating a motor brake module according to a first embodiment of the present disclosure.
Figure 4:
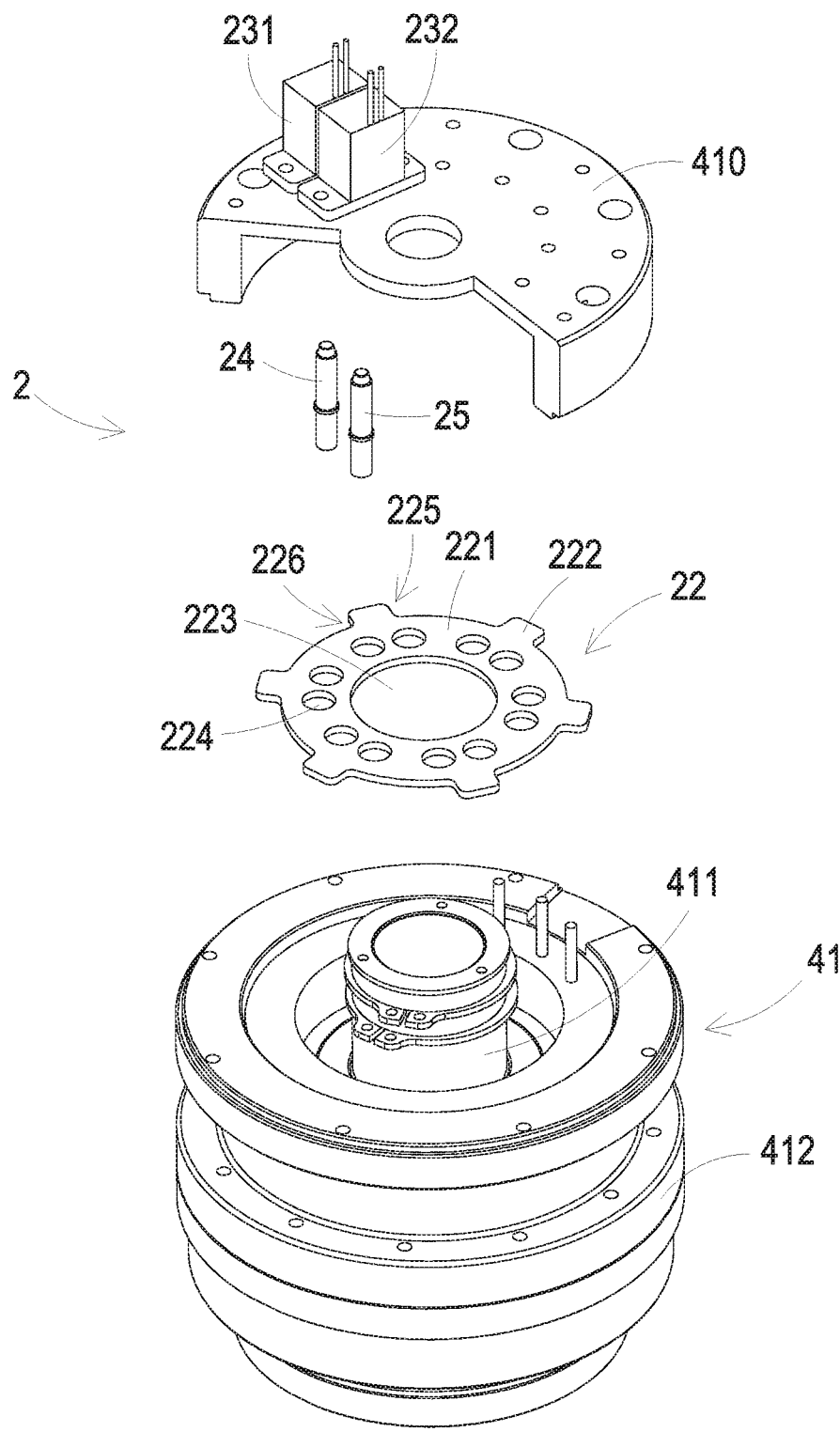
FIG. 4 is a schematic exploded view illustrating the motor brake module of FIG. 3.
Figure 5:
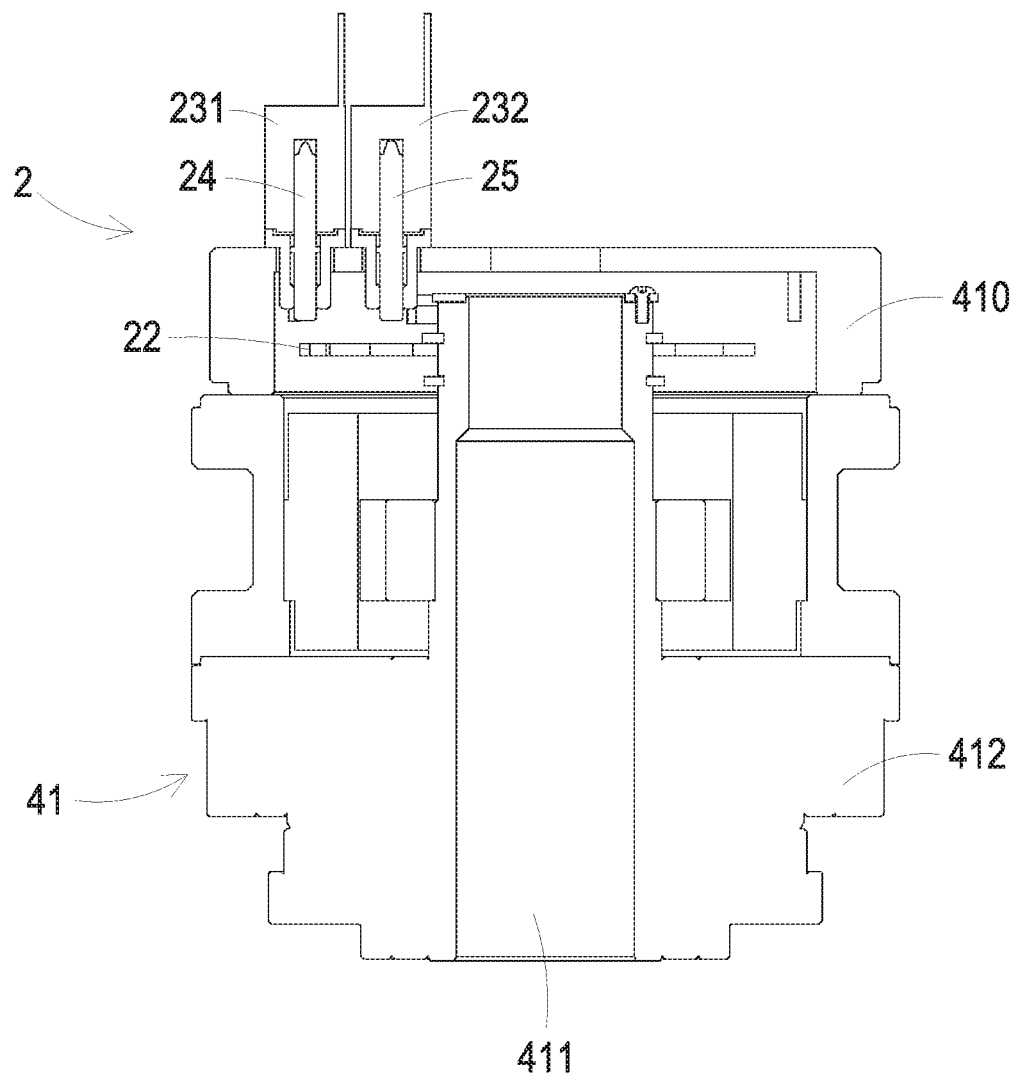
FIG. 5 is a schematic longitudinal cross-sectional view showing the motor brake module of FIG. 3 in an unbraking state.
Figure 6:
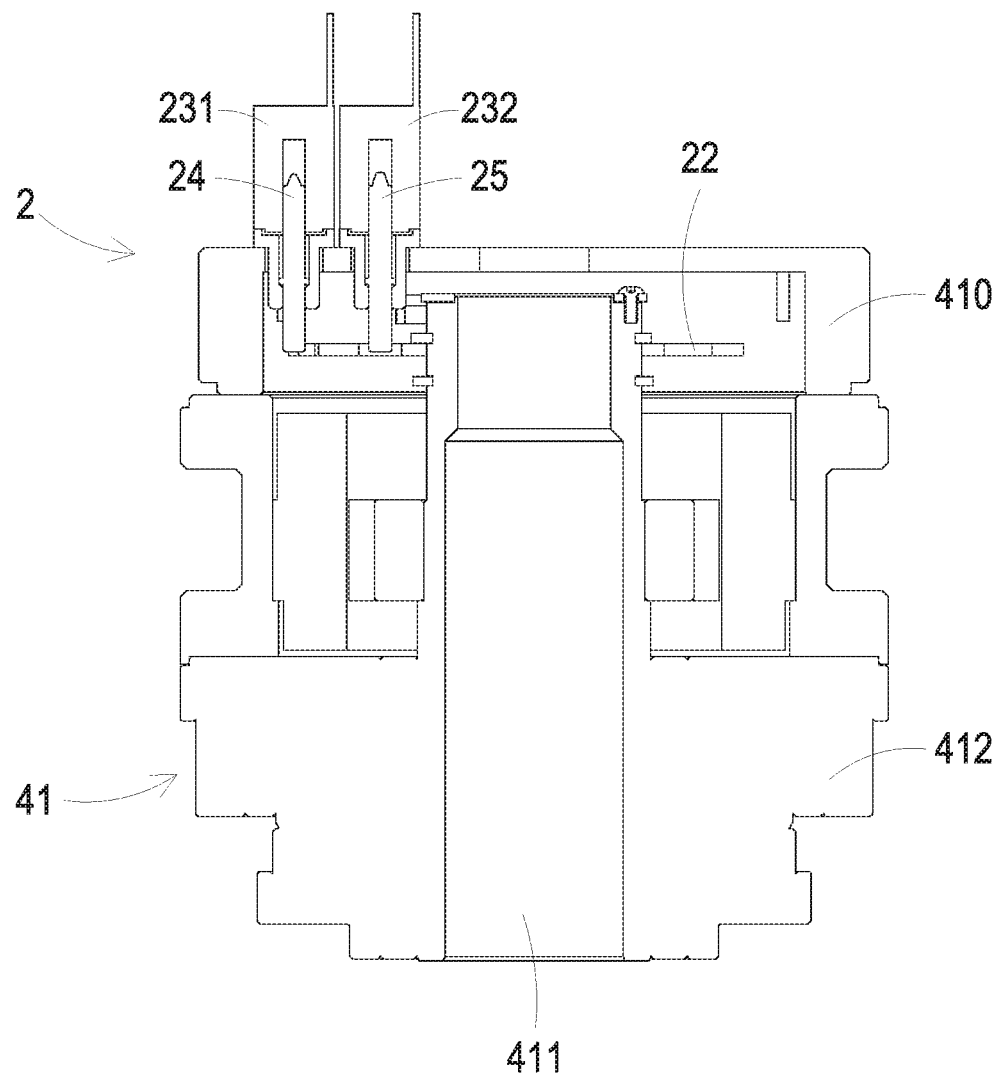
FIG. 6 is a schematic longitudinal cross-sectional view showing the motor brake module of FIG. 3 in a braking state.

FIG. 3 is a schematic perspective view illustrating a motor brake module according to a first embodiment of the present disclosure, FIG. 4 is a schematic exploded view illustrating the motor brake module of FIG. 3, FIG. 5 is a schematic longitudinal cross-sectional view showing the motor brake module of FIG. 3 in an unbraking state, and FIG. 6 is a schematic longitudinal cross-sectional view showing the motor brake module of FIG. 3 in a braking state. As shown in FIGS. 3, 4, 5 and 6, the motor brake module 2 is applicable but not limited to automation industry, such as robot module. The motor brake module 2 is used to brake a motor 41, such as the motor of the robot module. The motor 41 includes a shell 410, a shaft portion 411 and a driving portion 412. The shell 410 covers the motor brake module 2, at least portion of the driving portion 412 and at least portion of the shaft portion 411. The shaft portion 411 is disposed on the driving portion 412. When the motor 41 receives electrical power to work, the shaft portion 411 is driven by the driving portion 412 to rotate accordingly. Preferably but not exclusively, the motor brake module 2 is also applicable to the device comprising the motor in another field.

The motor brake module 2 includes a brake assembly, a block assembly and an armature assembly. In this embodiment, the brake assembly is disposed between the shell 410 and the driving portion 412. The brake assembly includes a brake plate 22 disposed between the shell 410 and the driving portion 412 of the motor 41. The brake plate 22 includes a main body 221 and plural teeth 222. The plural teeth 222 are protruded from the outer periphery of the main body 221 respectively and surrounded with the outer periphery of the main body 221. Each of the teeth 222 is contacted with a first block component 24. The main body 221 includes a shaft hole 223 and plural openings 224. The shaft hole 223 is defined on the center of the main body 221 for allowing the shaft portion 411 of the motor 41 to pass through. Consequently, the shaft portion 411 drives the brake plate 22 to rotate when the shaft portion 411 is rotated. The plural openings 224 run through the main body 221 and are surrounded around the shaft hole 223. The plural openings 224 are disposed between the outer periphery of the main body 221 and the shaft hole 223. Each of the opening 224 is allowed to be inserted by a second block component 25.

In this embodiment, the block assembly is connected with the armature assembly. The block assembly comprises the first block component 24 and the second block component 25. The first block component 24 is connected with a first armature base 231 and disposed between the first armature base 231 and the brake plate 22. In addition, the first block component 24 is corresponding to the outer periphery of the main body 221 of the brake plate 22. The second block component 25 is connected with a second armature base 232 and disposed between the second armature base 232 and the brake plate 22. In addition, the second block component 25 is corresponding to the positions of the plural openings 224 disposed on the main body 221.

In this embodiment, the armature assembly drives the block assembly to move between the armature assembly and the brake assembly. The armature assembly is disposed on the shell 410. The armature assembly includes the first armature base 231 and the second armature base 232. The first armature base 231 is disposed on the shell 410 and drives the first block component 24 to move between the first armature base 231 and the brake plate 22. When the first armature base 231 drives the first block component 24 to move toward the brake plate 22, the first block component 24 is contacted with one of the plural teeth 222 during the rotation of the brake plate 22. Therefore, the motor 41 is braked. Otherwise, when the first armature base 231 drives the first block component 24 to move toward the first armature base 231, the first block component 24 is not contacted with any tooth 222 of the plural teeth 222. Therefore, the motor 41 stops braking.

The second armature base 232 is disposed on the shell 410 and adjacent to the first armature base 231. The second armature base 232 drives the second block component 25 to move between the second armature base 232 and the brake plate 22. When the second armature base 232 drives the second block component 25 to move toward the brake plate 22, the second block component 25 passes through one of the plural openings 224 during the rotation of the brake plate 22. Therefore, the motor 41 is braked. Otherwise, when the second armature base 232 drives the second block component 25 to move toward the second armature base 232, the second block component 25 does not pass through any opening 224 of the plural openings 224. Therefore, the motor 41 stops braking.

From above, in this embodiment, when the armature assembly drives the block assembly to move toward the brake assembly, a portion of the block assembly is contacted with one of the plural teeth 222. Namely, when the first armature base 231 drives the first block component 24 to move toward the brake plate 22, the first block component 24 is contacted with one of the teeth 222. Moreover, when the armature assembly drives the block assembly to move toward the brake assembly, the other portion of the block assembly passes through one of the plural openings 224. Namely, when the second armature base 232 drives the second block component 25 to move toward the brake plate 22, the second block component 25 passes through one of the plural openings 224.

In some embodiments, the first block component 24 is in parallel with the second block component 25. The first block component 24 and the second block component 25 are in parallel with the shaft portion 411 respectively. In some embodiments, the motor brake module 2 further comprises an encoder. The construction of the encoder does not influence the operation of this invention, so that the encoder is not shown in FIGS of this invention.

The operating principles of the motor brake module 2 will be illustrated as follows. As shown in FIG. 5, when the motor 41 is not braked by the motor brake module 2, the shaft portion 411 of the motor 41 is rotated and the shaft portion 411 drives the brake plate 22 to rotate. The first block component 24 is magnetically attracted by the first armature base 231 to move in the direction away from the brake plate 22. Namely, the first block component 24 is moved toward the first armature base 231. At the same time, the second block component 25 is magnetically attracted by the second armature base 232 to move in the direction away from the brake plate 22. Namely, the second block component 25 is moved toward the second armature base 232. Therefore, the first block component 24 is not contacted with any tooth 222 and the second block component 25 does not pass through any opening 224.

Otherwise, as shown in FIG. 6, when the motor 41 is braked by the motor brake module 2, the first block component 24 is driven by the first armature base 231 to move toward the brake plate 22 and the first block component 24 is contacted with one of the plural teeth 222 of the brake plate 22. At the same time, the second block component 25 is driven by the second armature base 232 to move toward the brake plate 22 and the second block component 25 passes through one of the plural openings 224 of the brake plate 22. Therefore, when the first block component 24 is contacted with one of the plural teeth 222 and the second block component 25 passes through one of the plural openings 224, the brake plate 22 stops rotating. Moreover, the shaft portion 411 of the motor 41 stops rotating, and the motor 41 is braked.

As mentioned above, the first block component 24 is contacted with the tooth 222 of the brake plate 22. The second block component 25 passes through the opening 224 of the brake plate 22. Therefore, the motor 41 is braked by the motor brake module 2. According to the conventional technology, the motor brake module 1 has bigger backlash between the plural teeth 121. When compared with the conventional technology, the second block component 25 passes through the opening 224 of the brake plate 22 to reduce backlash between the plural teeth 222 of the brake plate 22. Therefore, the motor brake module 2 is advantageous because smaller backlash and the motor brake module 2 has less vibration in the braking motion of the motor 41.

Figure 7:
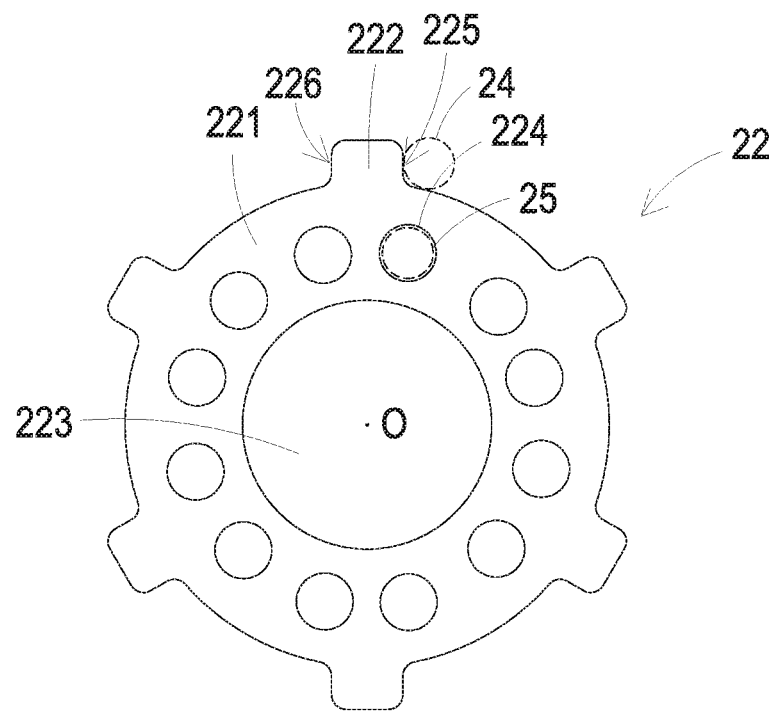
FIG. 7 is a schematic top view illustrating the brake plate of the motor brake module of FIG. 3.

FIG. 7 is a schematic top view illustrating the brake plate of the motor brake module of FIG. 3. Each of the teeth 222 of the brake plate 22 comprises a first side 225 and a second side 226. The first side 225 is corresponding to the second side 226. The extending direction of the first side 225 and the extending direction of the second side 226 include the corresponding openings 224 disposed on the main body 221 respectively. Each of the teeth 222 is adjacent to two corresponding openings 224. Therefore, the number of the plural openings 224 is equal to two times of the number of the teeth 222. Moreover, as shown in FIG. 7, when the brake plate 22 is rotated in clockwise, the first block component 24 is contacted with the first side 225 of one of the plural teeth 222, and the second block component 25 passes through the opening 224 adjacent to the first side 225 of the tooth 222 contacted with the first block component 24. Otherwise, when the brake plate 22 is rotated in counterclockwise, the first block component 24 is contacted with the second side 226 of one of the plural teeth 222, and the second block component 25 passes through the opening 224 adjacent to the second side 226 of the tooth 222 contacted with the first block component 24. The dotted lines of FIG. 7 represent the first block component 24 and the second block component 25 respectively.

In this embodiment, the aperture size of each of the openings 224 is equal to the size of the second block component 25. The shape of each of the openings 224 is but not limited to circular.

Please refer to FIG. 7 again. The shaft hole 223 comprises a hole center O. When the first block component 24 is contacted with the first side 225 or the second side 226 of one of the plural teeth 222, the second block component 25 passes through the opening 224 in the expending direction of the first side 225 or the second side 226 of the tooth 222 contacted with the first block component 24. The center of the first block component 24, the center of the second block component 25 and the hole center O of the shaft hole 223 are disposed in a line.

Figure 8:
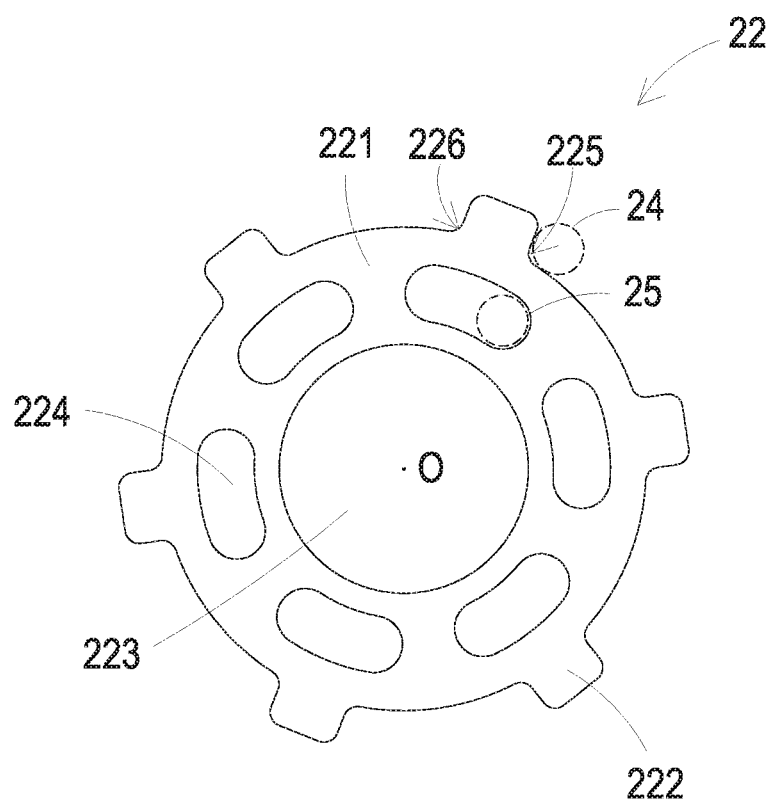
FIG. 8 is another schematic top view illustrating a variety embodiment of the brake plate of the motor brake module of FIG. 3.

FIG. 8 is another schematic top view illustrating a variety embodiment of the brake plate of the motor brake module of FIG. 3. The structures and operations of the brake plate 22 of FIG. 8 are similar to the brake plate 22 of FIG. 7. In comparison with FIG. 7, the aperture size of each of the openings 224 of the brake plate 22 is bigger than the size of the second block component 25. The shape of each of the openings 224 is but not limited to arc. Moreover, each of the teeth 222 is corresponding to the single opening 224. Therefore, the number of the openings 224 is equal to the number of the teeth 222. Moreover, as shown in FIG. 8, when the brake plate 22 is rotated in clockwise, the first block component 24 is contacted with the first side 225 of one of the plural teeth 222 and the second block component 25 passes through the opening 224 adjacent to the tooth 222 contacted with the first block component 24, wherein the second block component 25 is contacted with inner wall surface of the opening 224. The position of the inner wall surface of the opening 224 contacted with the second block component 25 is corresponding to the first side 225 of the tooth 222 contacted with the first block component 24. Otherwise, when the brake plate 22 is rotated in counterclockwise, the first block component 24 is contacted with the second side 226 of one of the plural teeth 222 and the second block component 25 passes through the opening 224 adjacent to the tooth 222 contacted with the first block component 24, wherein the second block component 25 is contacted with inner wall surface of the opening 224. The position of the inner wall surface of the opening 224 contacted with the second block component 25 is corresponding to the second side 226 of the tooth 222 contacted with the first block component 24. Namely, the position of the inner wall surface of the opening 224 contacted with the second block component 25 is corresponding to the position of the tooth 222 contacted with the first block component 24.

Please refer to FIG. 8 again. The shaft hole 223 comprises a hole center O. When the first block component 24 is contacted with one of the plural teeth 222 and the second block component 25 is contacted with the corresponding inner wall surface of the opening 224, the center of the first block component 24, the center of the second block component 25 and the hole center O of the shaft hole 223 are disposed in a line.

Figure 9:
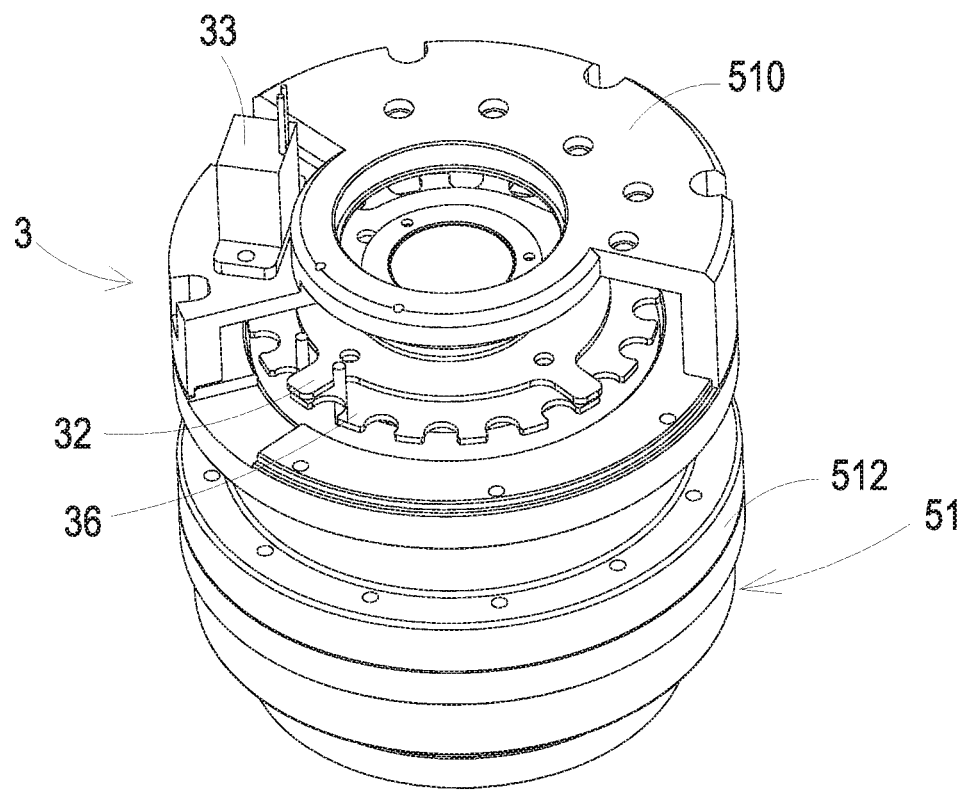
FIG. 9 is a schematic perspective view illustrating a motor brake module according to a second embodiment of the present disclosure.
Figure 10:
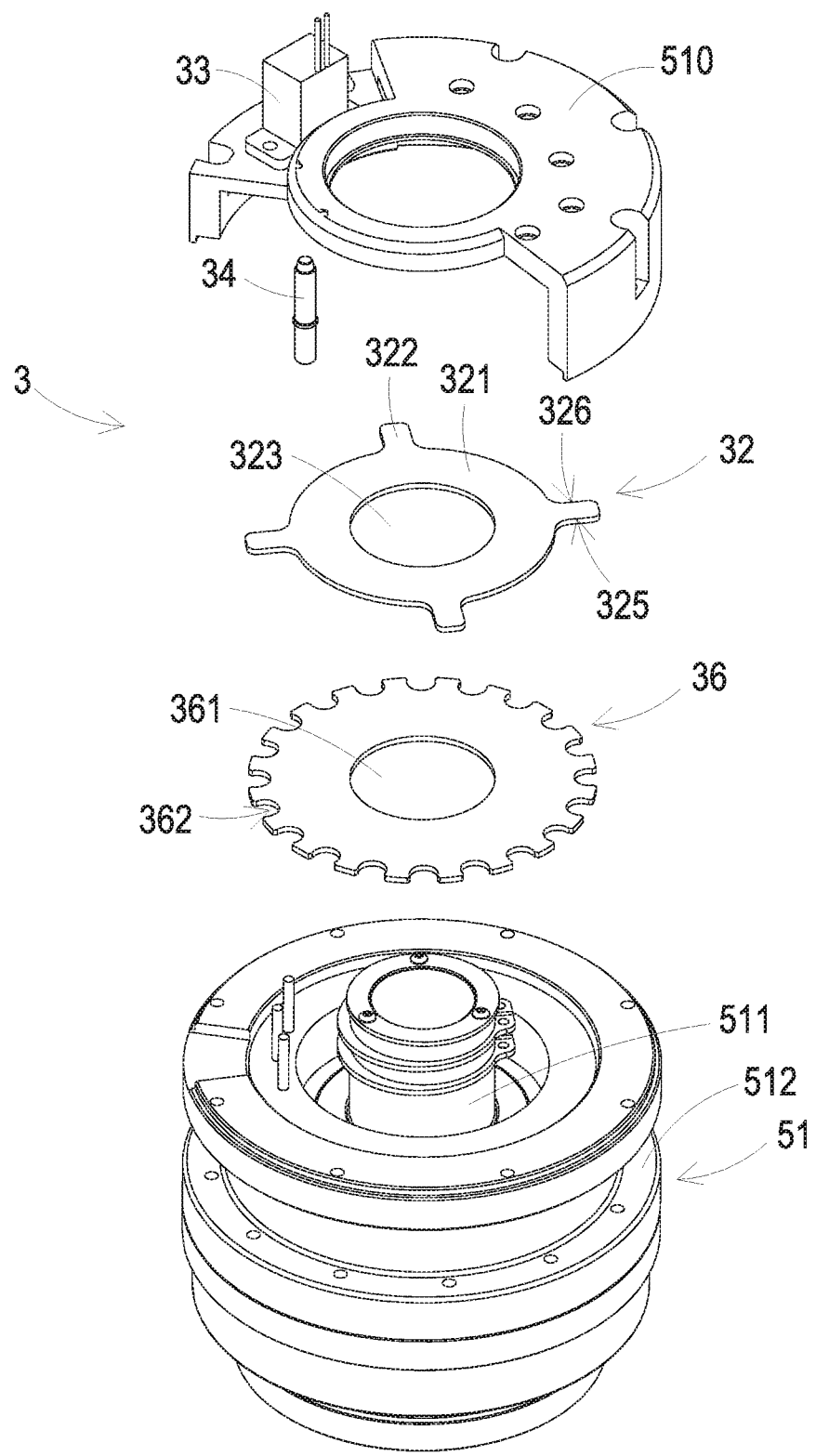
FIG. 10 is a schematic exploded view illustrating the motor brake module of FIG. 9.
Figure 11:
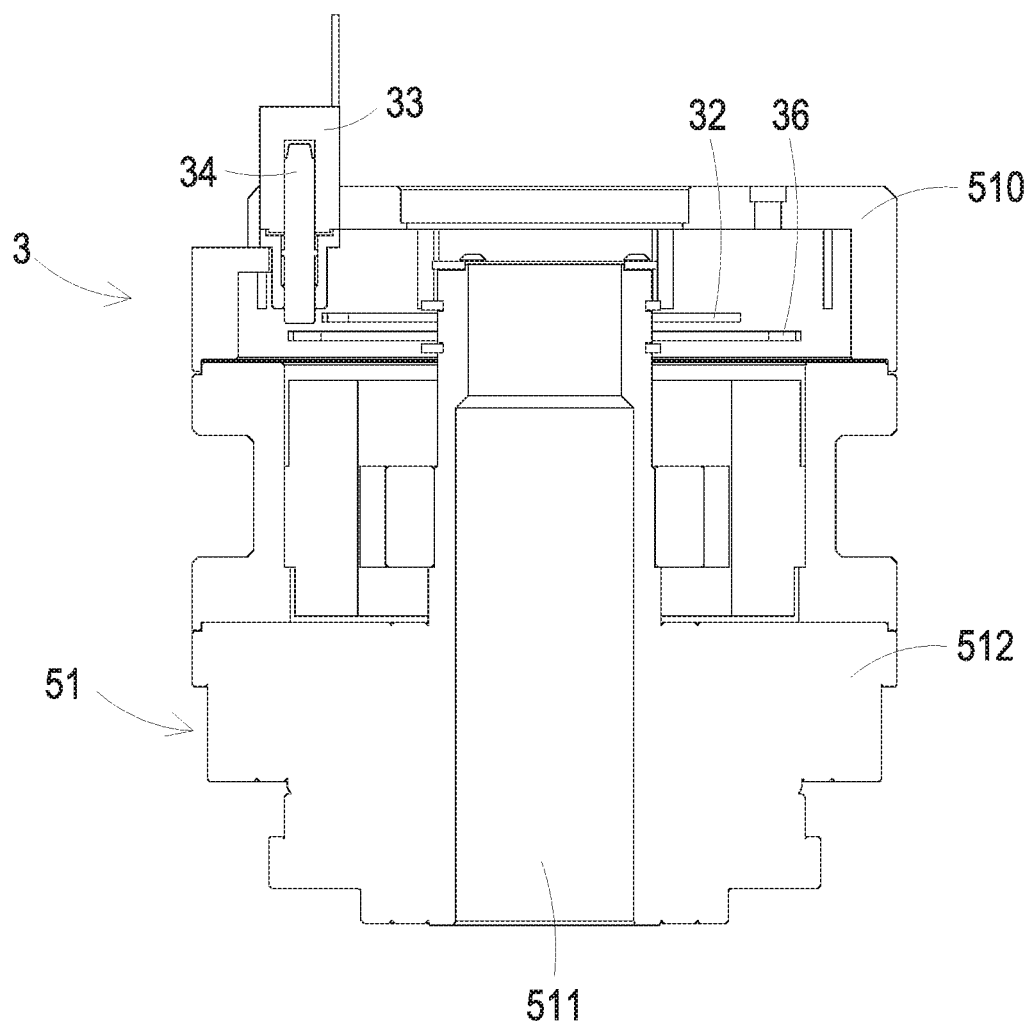
FIG. 11 is a schematic longitudinal cross-sectional view showing the motor brake module of FIG. 9 in an unbraking state.
Figure 12:
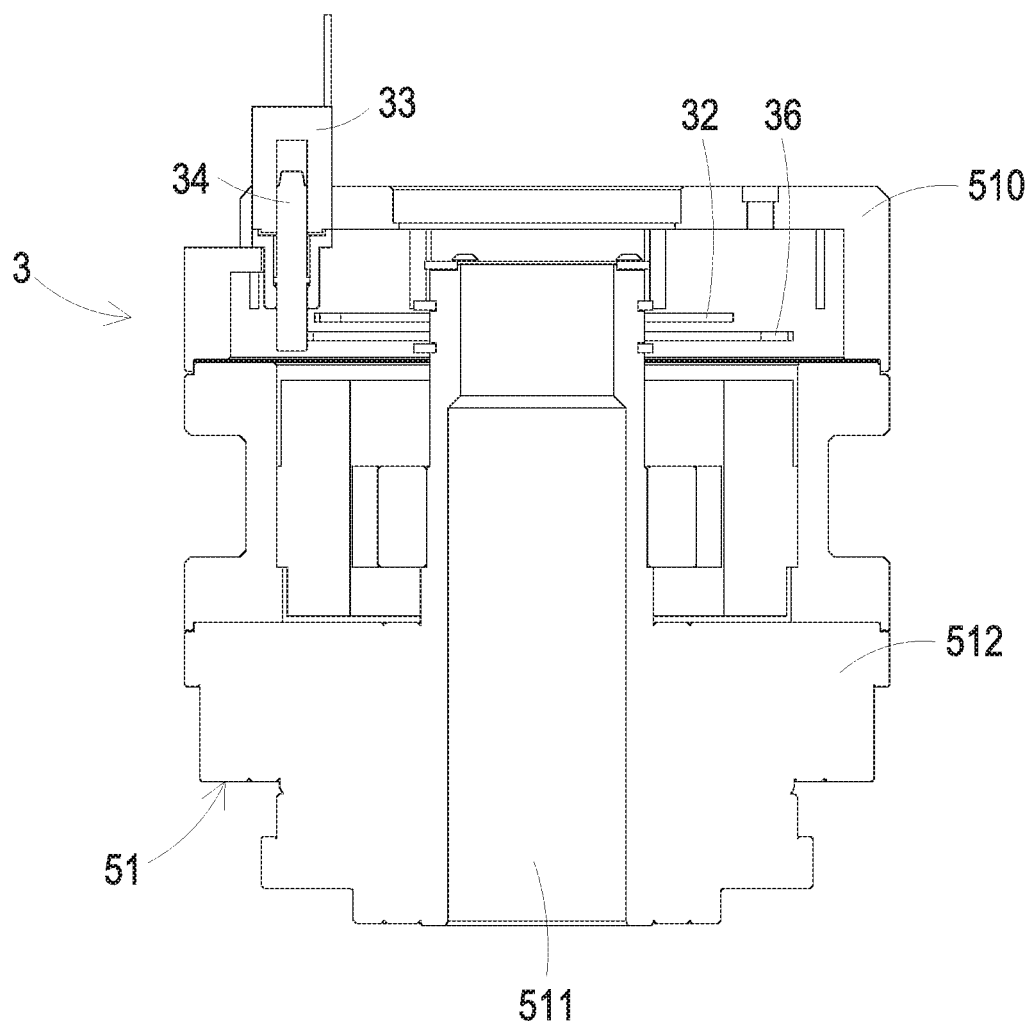
FIG. 12 is a schematic longitudinal cross-sectional view showing the motor brake module of FIG. 9 in a braking state.

FIG. 9 is a schematic perspective view illustrating a motor brake module according to a second embodiment of the present disclosure, FIG. 10 is a schematic exploded view illustrating the motor brake module of FIG. 9, FIG. 11 is a schematic longitudinal cross-sectional view showing the motor brake module of FIG. 9 in an unbraking state, and FIG. 12 is a schematic longitudinal cross-sectional view showing the motor brake module of FIG. 9 in a braking state. As shown in FIGS. 9, 10, 11 and 12, the structures and operations of the motor brake module 3 are similar to the motor brake module 2 of FIG. 3, and are not redundantly described herein. The brake assembly of the motor brake module 2 of FIG. 3 includes the brake plate 22, the armature assembly of FIG. 3 includes the first armature base 231 and the second armature base 232, and the block assembly of FIG. 3 includes the first block component 24 and the second block component 25. In comparison with the motor brake module 2 of FIG. 3, the brake assembly of the motor brake module 3 includes a first brake plate 32 and a second brake plate 36. The armature assembly of the motor brake module 3 includes an armature base 33. The block assembly of the motor brake module 3 includes a block component 34.

The first brake plate 32 is disposed between the shell 510 and the driving portion 512 of the motor 51. The first brake plate 32 includes a main body 321 and plural teeth 322. The plural teeth 322 are protruded from the outer periphery of the main body 321 respectively and surrounded with the outer periphery of the main body 321. Each of the teeth 322 is contacted with the block component 34. The main body 321 comprises a first shaft hole 323. The first shaft hole 323 is defined on the center of the main body 321 for allowing the shaft portion 511 of the motor 51 to pass through. Consequently, the shaft portion 511 drives the first brake plate 32 to rotate when the shaft portion 511 is rotated.

The second brake plate 36 is disposed between the first brake plate 32 and the driving portion 512. The second brake plate 36 includes a second shaft hole 361 and plural openings 362. The second shaft hole 361 is corresponding to the first shaft hole 323 of the first brake plate 32 for allowing the shaft portion 511 of the motor 51 to pass through. Consequently, the shaft portion 511 drives the second brake plate 36 to rotate when the shaft portion 511 is rotated. The plural openings 362 are disposed on the outer periphery of the second brake plate 36 and surrounded with the outer periphery of the second brake plate 36. Moreover, each of the openings 362 is formed on the concave of the outer periphery of the second brake plate 36. The block component 34 passes through the opening 362 and engaged with the opening 362.

The block component 34 is connected with the armature base 33 and disposed between the armature base 33 and the second brake plate 36. Moreover, the position of the block component 34 is corresponding to the outer periphery of the main body 321 of the first brake plate 32 and the outer periphery of the second brake plate 36.

The armature base 33 is disposed on the shell 510. The armature base 33 drives the block component 34 to move between the armature base 33 and the second brake plate 36. When the armature base 33 drives the block component 34 to move toward the second brake plate 36, the block component 34 is contacted with one of the plural teeth 322 during the rotation of the first brake plate 32. Furthermore, the block component 34 passes through one of the plural openings 362 during the rotation of the second brake plate 36. Consequently, the motor 51 is braked. Otherwise, when the armature base 33 drives the block component 34 to move toward the armature base 33, the block component 34 is not contacted with any tooth 322 of the plural teeth 322 and the block component 34 does not pass through any opening 362 of the plural openings 362. Therefore, the motor 51 stops braking.

In some embodiments, the motor brake module 3 further comprises an encoder. The construction of the encoder does not influence the operation of this invention, so that the encoder is not shown in FIGS of this invention.

The operating principles of the motor brake module 3 will be illustrated as follows. As shown in FIG. 11, when the motor 51 is not braked by the motor brake module 3, the shaft portion 511 of the motor 51 drives the first brake plate 32 and the second brake plate 36 to rotate and the block component 34 is magnetically attracted by the armature base 33 to move in the direction away from the first brake plate 32 and the second brake plate 36. Namely, the block component 34 is moved toward the armature base 33. Therefore, the block component 34 is not contacted with any tooth 322 and the block component 34 does not pass through any opening 362.

Otherwise, as shown in FIG. 12, when the motor 51 is braked by the motor brake module 3, the block component 34 is driven by the armature base 33 to move toward the first brake plate 32 and the second brake plate 36. The block component 34 is contacted with one of the plural teeth 322 of the first brake plate 32 and the block component 34 passes through one of the plural teeth 362 of the second brake plate 36. Therefore, when the block component 34 is contacted with one of the plural teeth 322 of the first brake plate 32 and the block component 34 passes through one of the plural openings 362 of the second brake plate 36, the first brake plate 32 and the second brake plate 36 stop rotating. Moreover, the shaft portion 511 of the motor 51 stops rotating, so that the motor 51 is braked.

Figure 13:
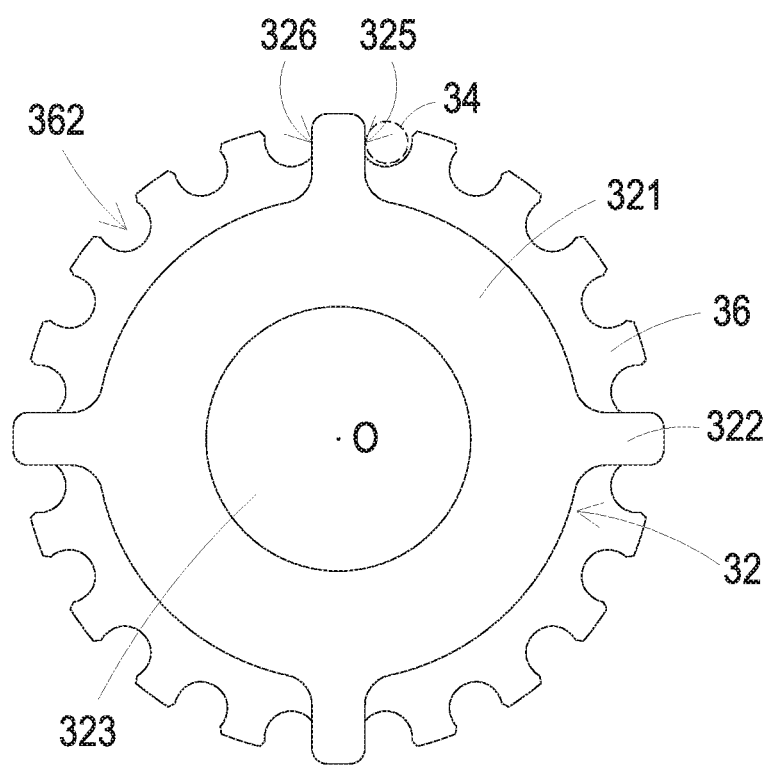
FIG. 13 is a schematic top view illustrating the first brake plate and the second brake plate of the motor brake module of FIG. 9.

FIG. 13 is a schematic top view illustrating the first brake plate and the second brake plate of the motor brake module of FIG. 9. Each of the teeth 322 of the first brake plate 32 is corresponding to the outer periphery of the second brake plate 36. Each of the teeth 322 of the first brake plate 32 includes a first side 325 and a second side 326. The first side 325 is corresponding to the second side 326. Moreover, as shown in FIG. 13, when the first brake plate 32 and the second brake plate 36 are rotated in clockwise, the block component 34 is contacted with the first side 325 of one of the plural teeth 322 of the first brake plate 32, and the block component 34 passes through the opening 362 adjacent to the first side 325 of the tooth 322 contacted with the block component 34. Otherwise, when the first brake plate 32 and the second brake plate 36 are rotated in counterclockwise, the block component 34 is contacted with the second side 326 of one of the plural teeth 322 of the first brake plate 32, and the block component 34 passes through the opening 362 adjacent to the second side 326 of the tooth 322 contacted with the block component 34. The dotted line of FIG. 13 represents the block component 34.

In this embodiment, the number of the openings 362 of the second brake plate 36 is bigger than the number of the teeth 322 of the first brake plate 32.

In this embodiment, the block component 34 of the motor brake module 3 is contacted with the tooth 322 of the first brake plate 32 and passes through the opening 362 of the second brake plate 36. Therefore, the motor 51 is braked by the motor brake module 3. According to the conventional technology, the motor brake module 1 has bigger backlash between the plural teeth 121 of the motor brake module 1. When compared with the conventional technology, the block component 34 of the motor brake module 3 passes through the opening 362 of the second brake plate 36 to reduce backlash between the plural teeth 322 of the first brake plate 32. Therefore, the motor brake module 3 is advantageous because the motor brake module 3 has smaller backlash and the motor brake module 3 has less vibration in the braking motion of the motor 51.

As mentioned above, the motor brake module of the invention includes two block components. One of the block components is contacted with the tooth of the single brake plate, and the other of the block components passes through the opening of the single brake plate. Alternatively, the motor brake module comprises one block component and two brake plates. The block component is contacted with the tooth of one of the brake plates and passes through the opening of the other of the brake plates. Therefore, the motor brake module is advantageous because the motor brake module has smaller backlash and the motor brake module has less vibration in the braking motion of the motor.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motor brake module for braking a motor, the motor comprising a shell, a shaft portion and a driving portion, the shaft portion disposed on the driving portion, the shaft portion driven by the driving portion and rotated accordingly, the motor brake module comprising:
   a brake assembly disposed between the shell and the driving portion, and comprising a shaft hole, plural teeth, plural openings and a brake plate, wherein the shaft portion passes through the shaft hole, so that the shaft portion drives the brake assembly to rotate when the shaft portion is rotated, wherein the brake plate comprises a main body and the plural teeth, wherein the plural teeth are protruded from an outer periphery of the main body and surrounded with the outer periphery of the main body, and the main body comprises the shaft hole and the plural openings, wherein the plural openings are surrounded around the shaft hole;
   a block assembly comprising a first block component and a second block component, wherein the first block component is corresponding to the outer periphery of the main body, and a position of the second block component is corresponding to positions of the plural openings disposed on the main body; and
   an armature assembly disposed on the shell and comprising a first armature base and a second armature base, wherein the first armature base is connected with the first block component for driving the first block component to move between the first armature base and the brake plate, wherein when the first block component is moved toward the brake plate, the first block component is contacted with one of the plural teeth, wherein the second armature base is connected with the second block component and adjacent to the first armature base for driving the second block component to move between the second armature base and the brake plate, wherein when the second block component is moved toward the brake plate, the second block component passes through one of the plural openings, so that the motor is braked.

2. The motor brake module according to claim 1, wherein the first block component is in parallel with the second block component, and the first block component and the second block component are in parallel with the shaft portion respectively.

3. The motor brake module according to claim 1, wherein each of the plural teeth comprises a first side and a second side, the first side is corresponding to the second side, wherein an expending direction of the first side and an expending direction of the second side comprise corresponding openings of the plural openings disposed on the main body respectively, and each of the plural teeth is adjacent to two corresponding openings of the plural openings.

4. The motor brake module according to claim 3, wherein a number of the plural openings is equal to two times of a number of the plural teeth.

5. The motor brake module according to claim 3, wherein an aperture size of each of the plural openings is equal to a size of the second block component.

6. The motor brake module according to claim 3, wherein when the first block component is contacted with the first side of one of the plural teeth, the second block component passes through an opening of the plural openings in the expending direction of the first side of a tooth of the plural teeth contacted with the first block component, wherein when first block component is contacted with the second side of one of the plural teeth, the second block component passes through an opening of the plural openings in the expending direction of the second side of the tooth of the plural teeth contacted with the first block component, wherein a center of the first block component, a center of the second block component and a hole center of the shaft hole are disposed in a line.

7. The motor brake module according to claim 1, wherein each of the plural teeth is corresponding to a single opening of the plural openings, and each of the plural teeth comprises a first side and a second side, wherein the first side is corresponding to the second side.

8. The motor brake module according to claim 7, wherein an aperture size of each of the plural teeth is bigger than a size of the second block component.

9. The motor brake module according to claim 7, wherein when the first block component is contacted with the first side or the second side of one of the plural teeth, the second block component passes through the single opening of the plural openings adjacent to a tooth of the plural teeth contacted with the first block component, and the second block component is contacted with an inner wall surface of the single opening of the plural openings, wherein a position of the inner wall surface of the single opening of the plural openings contacted with the second block component is corresponding to a position of the tooth of the plural teeth contacted with the first block component.

10. The motor brake module according to claim 7, wherein a number of the plural openings is equal to a number of the plural teeth.

* * * * *